US008255158B2

(12) United States Patent
O'Neill

(10) Patent No.: US 8,255,158 B2
(45) Date of Patent: Aug. 28, 2012

(54) TRAVEL ROUTE ADJUSTMENT

(75) Inventor: David J. O'Neill, Falls Church, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1168 days.

(21) Appl. No.: 11/690,294

(22) Filed: Mar. 23, 2007

(65) Prior Publication Data

US 2008/0234927 A1 Sep. 25, 2008

(51) Int. Cl.
*G06F 19/00* (2006.01)
(52) U.S. Cl. ........ 701/465; 701/423; 701/414; 340/990; 340/995
(58) Field of Classification Search .................. 701/201, 701/209, 210, 118, 117, 119, 400, 410, 465, 701/423, 414; 340/905, 934, 936, 995, 990, 340/995.1
See application file for complete search history.

(56) References Cited

U.S. PATENT DOCUMENTS

| | | | | |
|---|---|---|---|---|
| 5,862,509 A * | 1/1999 | Desai et al. | .................... | 701/209 |
| 5,913,917 A * | 6/1999 | Murphy | ......................... | 701/123 |
| 6,810,321 B1 * | 10/2004 | Cook | ............................ | 701/117 |
| 7,174,154 B2 * | 2/2007 | Ehlers | ......................... | 455/404.2 |
| 7,680,596 B2 * | 3/2010 | Uyeki et al. | .................. | 701/210 |
| 2003/0014286 A1 * | 1/2003 | Cappellini | ........................ | 705/5 |
| 2007/0138347 A1 * | 6/2007 | Ehlers | ........................... | 246/1 R |

* cited by examiner

*Primary Examiner* — Ronnie Mancho

(57) ABSTRACT

A data store includes at least one adjustment factor. A server that is configured to: receive a request for a travel route, the request including an origin, a destination, and an estimated time of departure; determine the travel route; calculate a normal travel time; use at least one adjustment factor to the normal travel time to calculate an adjusted travel time; and calculate an estimated time of arrival based on the estimated time of departure and the adjusted travel time.

21 Claims, 3 Drawing Sheets

TRAVEL ROUTE ADJUSTMENT

BACKGROUND

Persons who are planning trips often rely on route planning processes such as driving directions or the like to plan a route to be taken on a trip. For example, a trip route covering a shortest distance between an origin and a destination may be provided. Further, based on distances of trip segments and types of roads covered during trip segments, travel times for trip segments, and a total travel time for a trip, may be calculated. Thus, based on an expected departure time (EDT), an expected time of arrival (ETA) may be provided.

Routes provided by route planning processes usually allow a traveler to proceed from an origin to a destination. However, this may not be the case if obstructions, e.g., road closures, detours, etc., are present in the planned route. Moreover, travel times for trip segments and the total travel time for the trip may not very closely approximate actual travel time because actual road conditions may vary from the conditions anticipated by the route planning process. For example, changes in weather, changes in traffic loads, a time of day when the sun is rising or setting, road construction, etc. may not be taken into account by a route planning process but may have significant effect on a total travel time for a trip. Accordingly, present route planning processes may not plan the most efficient trip routes possible, and may not very accurately predict travel times or arrival times.

DETAILED DESCRIPTION OF THE PREFERRED EMBODIMENTS

Figure 1:
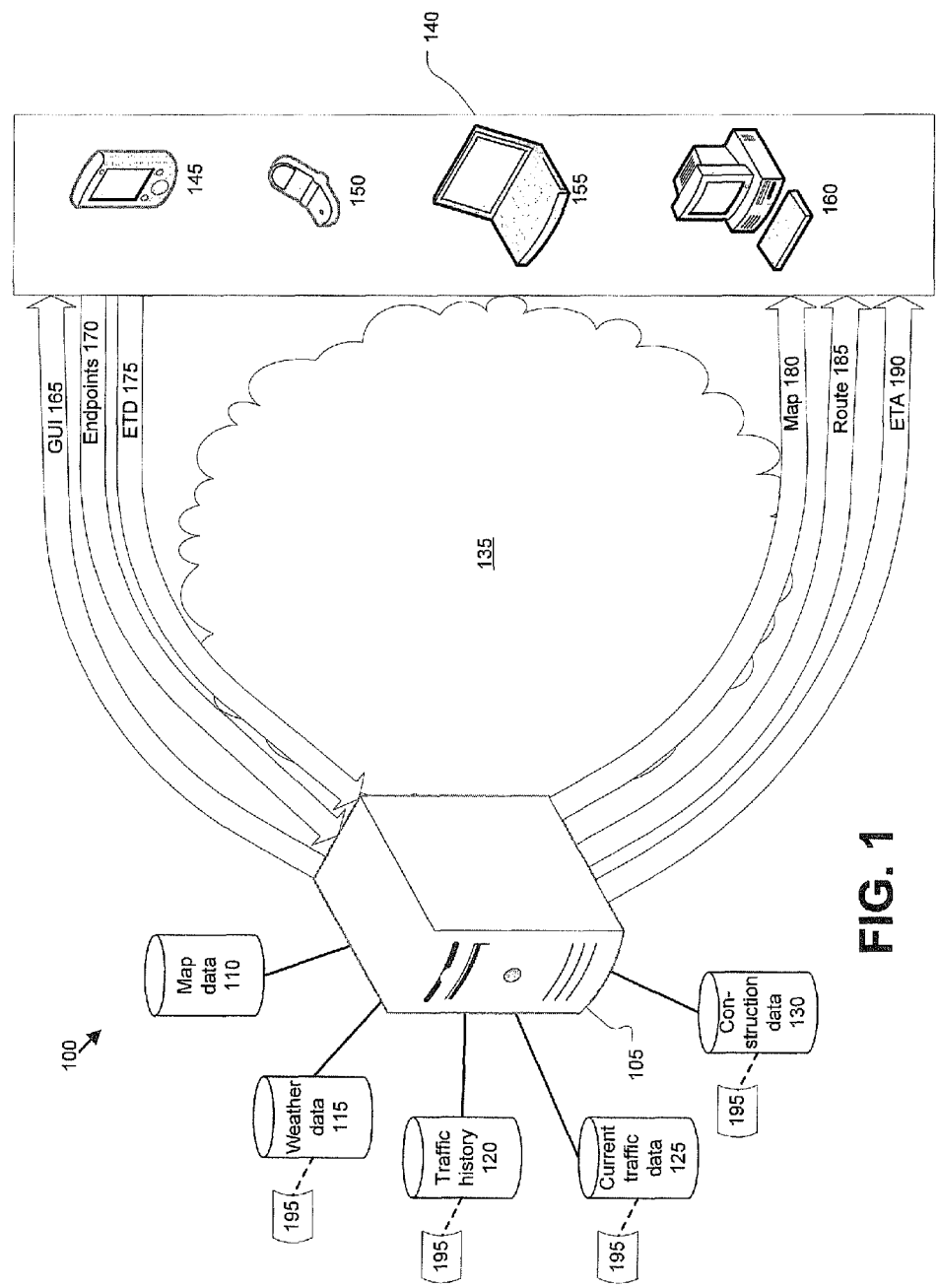
FIG. 1 illustrates an exemplary mapping and routing system.

FIG. 1 illustrates an exemplary mapping and routing system 100. The mapping and routing system 100 includes a map server 105 that selectively accesses map data 110, weather data 115, traffic history 120, current traffic data 125, and construction data 130. Map server 105 selectively communicates with one or more client devices 140 via a network 135. Client devices 140 may include a handheld computer 145, a cellular telephone 150, a laptop computer 155, and/or a desktop computer 160. Map server 105 provides a graphical user interface (GUI) 165 to client devices 140. Upon sending a query to map server 105 that includes trip endpoints 170 and an estimated departure time (EDT) 175, a client 140 may receive a response that includes a map 180, a trip route 185, and an estimated time of arrival (ETA) 190. Data such as weather data 115, traffic history 120, current traffic data 125, and construction data 130, etc. may include one or more adjustment factors 195 that are used to assist in determining an impact of weather, traffic conditions, construction, etc. on travel times.

Map server 105 is known for using map data 110 to provide map 175, which may be rendered on a client device 140. Using known route planning heuristics, map server 105 may also provide route 185 and ETA 190. However, route 185 may be less than optimum due to real world conditions not reflected in map data 110. Similarly, ETA 190 may be a poor prediction of an actual arrival time when based solely on map data 110. Therefore, as described in more detail below, map server 105 accesses weather data 115, traffic history 120, current traffic data 125, and/or construction data 130 to determine adjustments as appropriate to route 185 and ETA 190. Each of map data 110, weather data 115, traffic history 120, current traffic data 125, and construction data 130 may be included in a data store with an map server 105, or may be included in a separate database, e.g., a relational database, accessible by map server 105. For example, map server 105 could access a database through a local networks, through network 135, etc. Some or all of map data 110, weather data 115, traffic history 120, current traffic data 125, and construction data 130 may be purchased from vendors of such information and included within map server 105.

Map data 110 is known for associating map images with locations on a map, e.g., according to geo-coordinates. Accordingly, when map server 105 is provided with geographic information that may be translated into geo-coordinates, e.g., a city, a zip code, etc., map server 105 may provide map 180.

Weather data 115 is also generally associated with a geographic location, such as a city, zip code, etc. Weather data 115 may include one or both of a set of current weather data 115 and a set of forecast weather data 115. In any case, weather data 115 is generally associated with a period of time. The association of weather data 115 with a period of time is important so that an appropriate set of weather data 115 may be applied to an ETD 175 in determining an ETA 190.

Traffic history 120 includes data concerning traffic conditions for various roads at various times of day. For example, for a particular interstate highway, traffic history 120 may include data concerning an average amount of time that it takes for a motorist to traverse given segments of the interstate highway at different times of day, e.g., at each hour throughout the day. Traffic history 120 generally also takes into account a day of the week specified for ETD 175. For example, as is known, traffic conditions may differ significantly from normal workweek conditions during weekends and holidays. Traffic history 120 generally assumes ideal or good weather conditions, and that a road is unobstructed by construction work or the like.

Current traffic data 125 includes real-time or near real time reporting concerning current traffic conditions for various roads. For example, current traffic data 125 may include data concerning an average amount of time that it is taking at the present time or at a time in near the present time to traverse a given segment of an interstate highway. Current traffic data 125 may not always be available to server 105. However, when traffic data 125 is available, it offers the benefit of inherently talking into account weather conditions, construction activity, etc.

Construction data 130 includes data concerning construction work or the like that is being performed on various roads. Construction data 130 may be updated in real-time or near real time, although construction data 130 is more likely to be updated on a periodic basis, e.g., once per day. Construction data 130 generally includes information concerning an effect that road construction or the like is having on traffic. For example, construction data 130 may include information that a road is closed to construction, if this is the case. Further, construction data 130 may include information relating to an amount of time that it will take a motorist to traverse a construction zone, and may further include such information according to various times of day, similar to the manner in which traffic history 120 is provided as described above.

Adjustment factors 195 may be included in weather data 115, traffic history 120, current traffic data 125, and construction data 130, e.g., as provided by a vendor of such data, or may be determined by a user of, or program instructions in, server 105, or some commendation thereof, and associated with such data. In any event, adjustment factors 195 model actual travel conditions as influenced by weather, traffic conditions, construction activity, etc. Adjustment factors 195 may be used to determine adjustments to an ETD 175 to generate an adjusted ETA 190. Table 1 illustrates an exemplary association of adjustment factors 195 with weather data 115.

TABLE 1

| RoadID | SegmentID | Weatherstate | Factor |
|---|---|---|---|
| I495 | 66amlegbr | lightrain | 1.1 |
| I495 | 66amlegbr | heavyrain | 1.7 |
| I495 | 66amlegbr | lightsnow | 1.5 |
| I495 | 66amlegbr | heavysnow | 2.5 |
| I495 | 66amlegbr | frzrain | 3 |
| I495 | 66amlegbr | clear | 0.8 |

Table 2 illustrates an exemplary association of adjustment factors 195 with traffic history 120.

TABLE 2

| RoadID | SegmentID | Time | Factor |
|---|---|---|---|
| I495 | 66amlegbr | 6 AM | 1.1 |
| I495 | 66amlegbr | 7 AM | 1.3 |
| I495 | 66amlegbr | 8 AM | 1.7 |
| I495 | 66amlegbr | 9 AM | 1.4 |
| I495 | 66amlegbr | 10 AM | 1.2 |

Table 3 illustrates an exemplary association of adjustment factors 195 with current traffic data 125.

TABLE 3

| RoadID | SegmentID | Status | Factor |
|---|---|---|---|
| I495 | 66amlegbr | accident | 1.4 |
| I495 | amlegbrcabinjohn | OK | 1 |
| I495 | cabinjohnriverrd | slow | 1.5 |
| I495 | riverrdspur | stopgo | 2 |
| I495 | spurrte29 | slow | 1.5 |

Table 4 illustrates an exemplary association of adjustment factors 195 with construction data 130.

TABLE 4

| RoadID | SegmentID | Status | Factor |
|---|---|---|---|
| I495 | 66amlegbr | laneclosed | 1.5 |
| I495 | amlegbrcabinjohn | shoulderwork | 1.3 |
| I495 | cabinjohnriverrd | shoulderclosed | 1.1 |
| I495 | riverrdspur | sharedlane | 1.7 |
| I495 | spurrte29 | potholes | 1.2 |

In an embodiment, adjustment factors 195 may be weighted, e.g., according to whether the factors 195 are associated with weather data 115, traffic history 120, current traffic data 125, or construction data 130. Table 5 illustrates an exemplary weighting of adjustment factors 195.

TABLE 5

| Type | Weight |
|---|---|
| weather data | 1.5 |
| traffic history | .9 |
| current traffic data | 1.1 |
| construction data | 1.3 |

With respect to the adjustment factors 195 and weights shown in each of Tables 1-5, it should be understood that these number are shown for illustrative purposes only. Such weights and adjustment factors 195 may be determined empirically, and vary significantly from the above illustrative numbers in various implementations.

Network 135 is generally a packet network and further is generally an internet protocol (IP) network that utilizes known protocols found generally within the internet protocol suite. For example, network 135 uses protocols such as user datagram protocol (UDP), transmission control protocol (TCP), hypertext transfer protocol (HTTP), etc. Further, network 135 may include a variety of networks such as a wide area network (WAN), e.g., the Internet, a local area network (LAN), a fiber-optic network, etc. As is known, a packet switched network such as network 135 may be used to transport a variety of data, including multimedia data, such as images, audio and video. Server 105 and client devices 140 may be connected to, and communicate through, network 135 in a variety of known ways, some examples of which are provided below.

Handheld computer 145 may be a personal digital assistant (PDA) or the like and may include an operating system such as the Palm® OS from Palm, Inc. of Sunnyvale, Calif., or Windows® CE from Microsoft Corporation of Redmond, Wash. Handheld computer may connect to network 135 using a wireless connection such as is known.

Cellular telephone 150 may similarly include an operating system such as the Palm OS or Windows CE, or some other operating system provided by a cellular telephone manufacturer. Cellular telephone 150 may connect to network 135 through a cellular telephone network (not shown in FIG. 1) as is known. In any event, cellular telephone 150 generally connects to network 135 wirelessly.

Laptop computer 155 in desktop computer 160 may connect to network 135 using any one of the variety of known wired or wireless connection mechanisms. Computers 155 and 160 may include any one of a variety of known operating systems, such as Windows, UNIX, Linux, etc.

In general, client devices 140 include a web browser or the like whereby a client device 140 may communicate with server 105, and may render GUI 165 provided by server 105. GUI 165 may include a form or the like that allows a user to provide its input endpoints 170 and ETD 175. GUI 165 may further include renderings of map 180, route 185, and/or ETA 190. Moreover, instead of using a web browser, a client device 140 may include client software written specifically for the purpose of communicating with server 105 and rendering GUI 165 provided by server 105.

Computing devices such as server 105, client devices 140, etc., may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system.

Computing devices, such as those mentioned herein, generally are capable of executing instructions stored on a computer readable medium. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
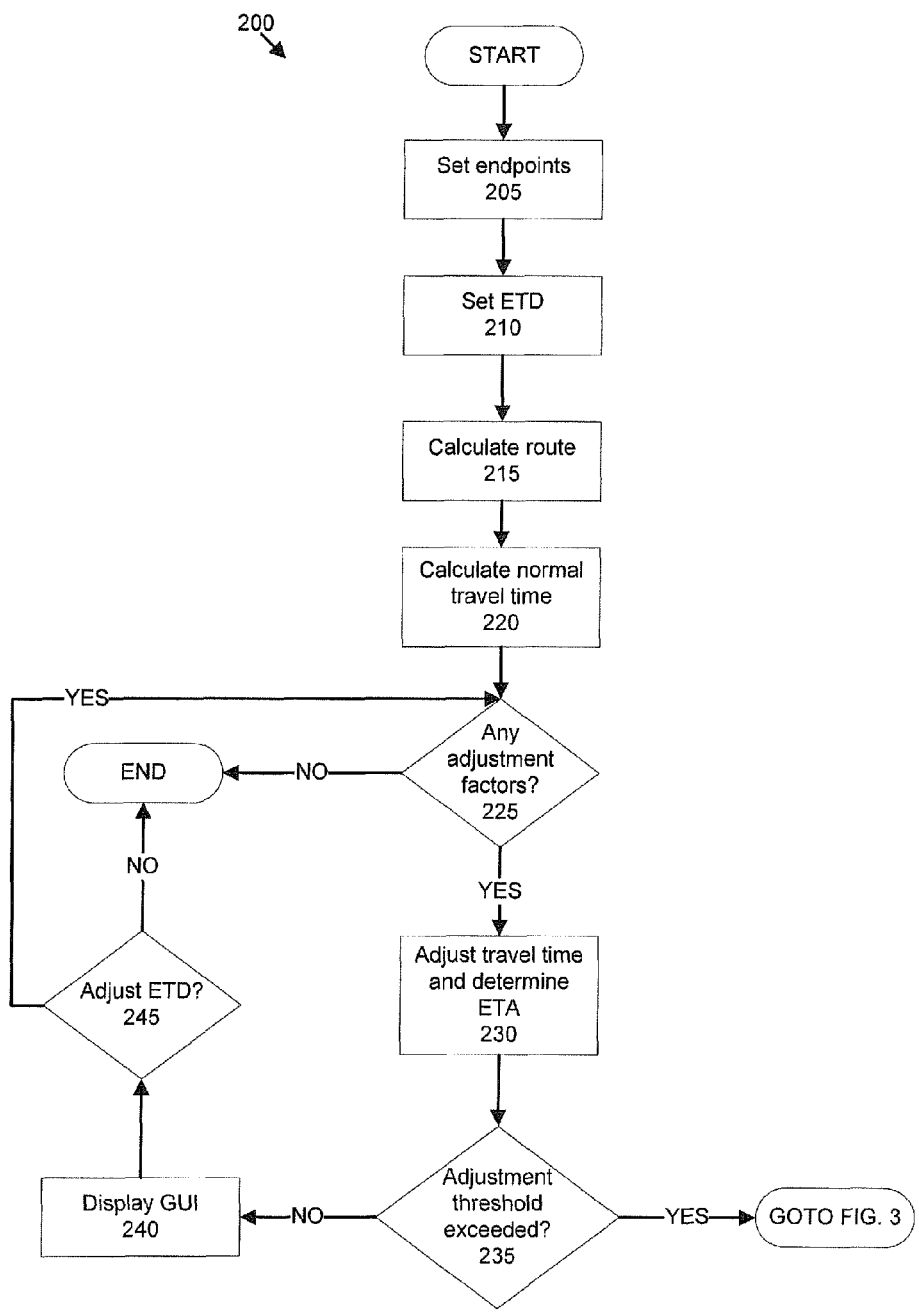
FIG. 2 illustrates an exemplary process for providing an adjusted estimated time of arrival.

FIG. 2 illustrates an exemplary process 200 for providing an adjusted ETA 190.

In step 205, a user sets endpoints 170, e.g., by entering a trip origin and a trip destination in a form provided in GUI 165.

Next, in step 210, a user provides an ETD 175, e.g., by providing a time in a form provided in GUI 165. It is to be understood that information entered in a form or the like in GUI 165 may be submitted to server 105 using known mechanisms such as HTTP.

Next, in step 215, server 105 calculates a route 185 based on endpoints 170.

Next, in step 220, server 105 calculates a normal travel time for the route 185 calculated in step 215. The "normal" travel time calculated in this step is generally based on a distance and possibly on a type of road being traversed. However, a normal travel time is not adjusted for factors such as weather, construction, traffic conditions, etc.

Next, in step 225, server 105 determines whether there are any adjustment factors 195 according to which the normal travel time calculated in step 220 should be adjusted. If server 105 fails to identify any such adjustment factors 195, process 200 ends. However, if one or more adjustment factors 195 are identified in step 225, step 230 is executed next. To identify such adjustment factors 195, server 105 generally accesses one or more of weather data 115, traffic history 120, current traffic data 125, and construction data 130 to determine whether such adjustment factors 195 are included in any of the data 115, 120, 125, or 130, etc., or have been associated with such data 115, 120, 125, or 130 etc.

In step 230, the normal travel time calculated in step 220 is adjusted according to the one or more adjustment factors 195 identified in step 225, and ETA 190 is calculated by adding the adjusted travel time to ETD 175. In the simplest case, one adjustment factor 195 is identified in step 225. Therefore, the normal travel time calculated in step 220 may simply be multiplied by the adjustment factor 195 identified in step 225.

Where multiple adjustment factors 195 were identified in step 225, it will be recognized that there are various ways to combine adjustment factors 195 before applying them to the normal travel time calculated in step 220. For example, adjustment factors 195 could be multiplied by each other, or they could be added together, before the result of such multiplication or addition is multiplied by the normal travel time calculated in step 220 to obtain an adjusted travel time. For example, empirical research may indicate that, for road segments were construction work is being performed, the presence of adverse weather conditions such as heavy rain may have only half the effect that such adverse weather conditions would have absent construction work. In this example, therefore, a weather adjustment factor 195 may be diminished before being multiplied by a construction adjustment factor 195. In this vein, other more sophisticated heuristics are possible, e.g., server 105 could be programmed to take into account various kinds of adjustment factors 195, and to accord different weights to different kinds of adjustment factors 195, such weights being illustrated in Table 5 above.

Next, in step 235, server 105 may determine whether the adjusted travel time determined in step 230 exceeds a predetermined threshold. For example, server 105 may determine whether the adjusted travel time determined in step 230 is more than a predetermined percentage greater than the normal travel time determined in step 220. If the adjusted travel time determined in step 230 exceeds the predetermined threshold, then process 300 may be executed as is described below with reference to FIG. 3. Otherwise, step 240 is executed next.

In step 240, GUI 165 is provided to a client device 140 for display. Client device 140 generally includes a web browser, as mentioned above. Server 105 may include map 180, route 185, and ETA 190 in GUI 165. For example, route 185 may be overlaid on map 180 and/or may be described in a textual list or the like. ETA 190 may be provided in a textual description along with a description of route 185.

Next, in step 245, server 105 determines whether a user of the client device 140 has input a request to adjust ETD 175. GUI 165 may provide a form, a control, or the like to allow a user to adjust ETD 175. For example, GUI 165 may include a slider control or the like, whereby the user may cause ETD 175 to be earlier when the slider is moved to the left, and later when the slider is moved to the right. Alternatively or additionally, GUI 165 could include other controls such as a drop-down list of possible ETDs 175, or a text box into which an ETD 175 could be entered. In any event, if no request to adjust ETD 175 is made, process 200 ends. Otherwise, process 200 returns to step 225 wherein server 105 determines whether any adjustment factors 195 are present based on the newly input ETD 175.

Figure 3:
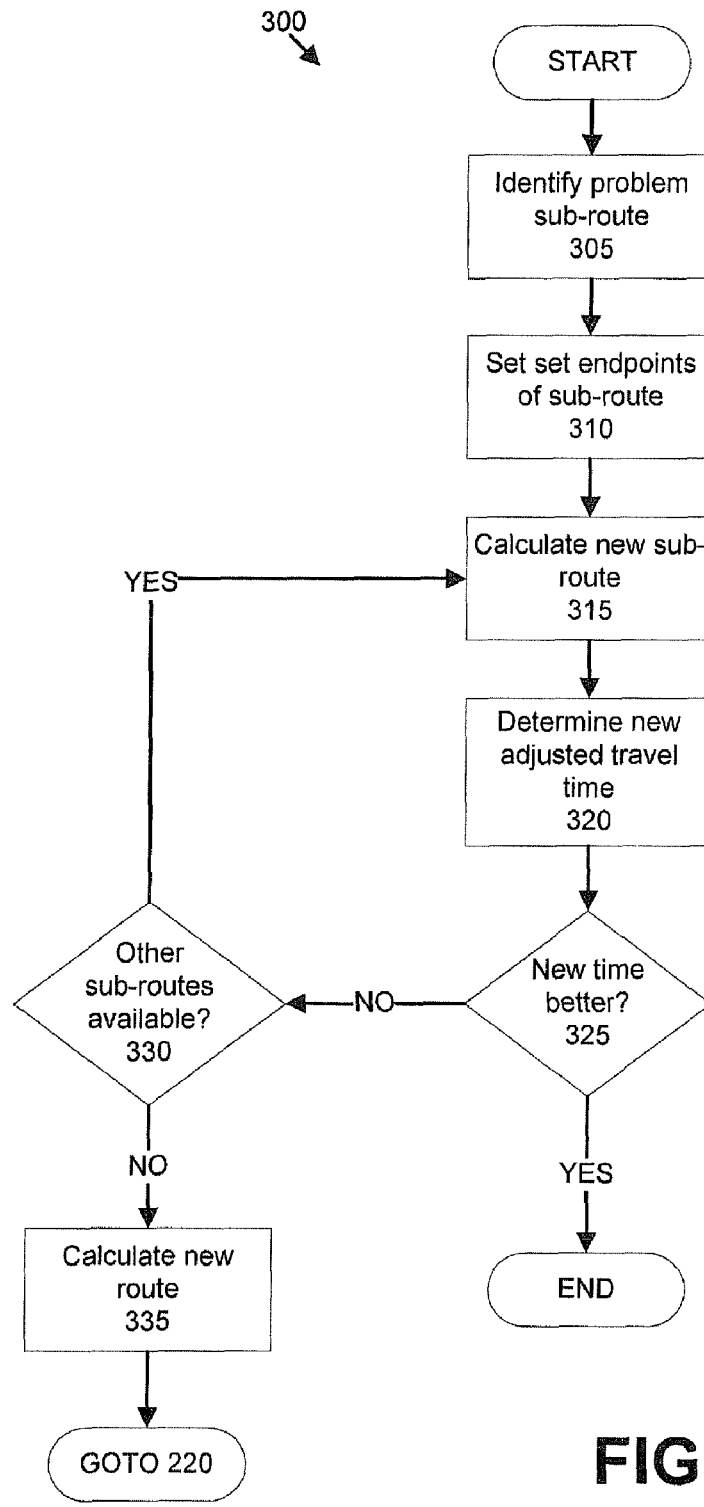
FIG. 3 illustrates an exemplary process for selecting a new route to improve the adjusted estimated time of arrival provided by the process of FIG. 2.

FIG. 3 illustrates an exemplary process 300 for selecting a new route to improve the adjusted ETA 190 provided as described above with respect process 200.

In step 305, map server 105 determines a portion, i.e., a sub-route, of route 185 that has an adjusted travel time longer than a normal travel time for the sub-route, e.g., that exceeds the predetermined threshold mentioned above with respect to step 235 of process 200. Such determination may be made in a number of different ways. For example, process 200 or some similar process may be conducted in an iterative fashion for various segments and/or groups of segments, i.e. portions or sub-routes, of route 185. Once a sub-route of the route 185 determined in step 215 of process 200 above has been identified that appears to consume a maximum amount of adjusted travel time, process 300 proceeds to step 310.

As described above with respect to step 235 of process 200, step 305 may be executed if it is determined in step 235 the adjusted travel time determined in step 230 exceeds a predetermined threshold.

Next, in step 310, server 105 sets a set of endpoints for the sub-route identified in step 305 as a prelude to calculating a new sub-route between the endpoints of the sub-route identified in step 305.

Next, in step 315, server 105 calculates a new sub-route between the endpoints identified in step 310. Generally, the sub-route calculated in step 315, will be a sub-route having a normal travel time greater than the normal travel time of the sub-route identified in step 305, but as close to it as possible. Although not illustrated in FIG. 3, it is possible that server 105 will be unable to calculate a new sub-route between the endpoints identified in step 310, in which case process 300 will end.

Next, in step 320, server 105 determines an adjusted travel time for the sub-route calculated in step 315, e.g., as described above with respect to process 200.

Next, in step 325, server 105 determines whether the adjusted travel time determined in step 320 is less than the adjusted travel time for the sub-route identified in step 305. It should be understood that, regardless of the outcome of this determination, process 300 could continue to investigate other possible sub-routes to determine if such other possible sub-routes had lower adjusted travel times and the adjusted travel time for the sub-route identified in step 305. However, as illustrated in FIG. 3, if the adjusted travel time determined in step 320 is less than the adjusted travel time for the sub-route identified in step 305, process 300 may end. Alternatively, although not illustrated in FIG. 3, step 335, described below is following step 330, may be executed following step 325 if the adjusted travel time determined in step 320 is less than the adjusted travel time for the sub-route identified in step 305. Otherwise, process 300 proceeds to step 330.

In step 330, server 105 determines whether any additional sub-routes exist between the endpoints identified in step 310. If so, process 300 returns to step 315. Otherwise, step 335 is executed next.

In step 335, server 105 calculates a new route 185, and then transfers control to step 220 of process 200, described above. Accordingly, server 105 may iterate processes 200 and 300 multiple times until identifying a route 185 with an optimal adjusted travel time.

CONCLUSION

With regard to the processes, systems, methods, heuristics, etc. described herein, it should be understood that some or all of such processes, etc. may be implemented as computer executable instructions on a computer readable medium. Moreover, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims set forth below.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
receiving a request for a travel route, the request including an origin, a destination, and an estimated time of departure;
determining the travel route;
calculating a normal travel time;
using the normal travel time and the estimated time of departure to determine an estimated time of arrival;
multiplying the normal travel time by at least one adjustment factor to calculate an adjusted travel time, wherein the at least one adjustment factor is a numeric value associated with at least one of a weather condition, a construction condition, and an estimated travel time for a segment of the travel route based on current traffic data; and
calculating an adjusted estimated time of arrival based on the estimated time of departure and the adjusted travel time.

2. The method of claim 1, further comprising providing the estimated time of arrival to a client device.

3. The method of claim 1, further comprising:
receiving an input modifying the estimated time of departure; and
calculating a new estimated time of arrival based at least in part on the input.

4. The method of claim 1, further comprising:
determining that the adjusted travel time exceeds a predetermined threshold;
identifying a set of endpoints for a sub-route of the travel route where an adjusted travel time for the sub-route exceeds a predetermined threshold associated with the sub-route; and
calculating a new sub-route between the endpoints.

5. The method of claim 1, wherein the at least one adjustment factor is a plurality of adjustment factors.

6. The method of claim 1, further comprising obtaining the at least one adjustment factor via a network.

7. The method of claim 1, further comprising receiving the request via a network.

8. The method of claim 1, tangibly embodied as a set of computer-executable instructions on a computer-readable medium.

9. The method of claim 1, wherein the adjustment factor is weighted according to whether the adjustment factor is associated with at least one of the weather condition, the construction condition, and the estimated travel time for a segment of the travel route based on current traffic data.

10. A system, comprising:
a data store including at least one adjustment factor; and
a server that is configured to:
   receive a request for a travel route, the request including an origin, a destination, and an estimated time of departure;
   determine the travel route;
   calculate a normal travel time;
   determine an estimated time of arrival using the normal travel time and the estimated time of departure;
   multiply the normal travel time by at least one adjustment factor to calculate an adjusted travel time, wherein the at least one adjustment factor is a numeric value associated with at least one of a weather condition, a construction condition, and an estimated travel time for a segment of the travel route based on current traffic data; and
   calculate an adjusted estimated time of arrival based on the estimated time of departure and the adjusted travel time.

11. The system of claim 10, wherein the server is further configured to provide the estimated time of arrival to a client device.

12. The system of claim 10, wherein the server is further configured to:
   receive an input modifying the estimated time of departure; and
   calculate a new estimated time of arrival based at least in part on the input.

13. The system of claim 10, wherein the server is further configured to:
   determine that the adjusted travel time exceeds a predetermined threshold;
   identify a set of endpoints for a sub-route of the travel route; wherein a portion of the adjusted travel time attributable to the sub-route exceeds a predetermined threshold for the sub-route; and
   calculate a new sub-route between the endpoints.

14. The system of claim 10, wherein the at least one adjustment factor is a plurality of adjustment factors.

15. The system of claim 10, wherein the server is further configured to obtain the at least one adjustment factor via a network.

16. The system of claim 10, wherein the request is received via a network.

17. The system of claim 10, wherein the adjustment factor is weighted according to whether the adjustment factor is associated with at least one of the weather condition, the construction condition, and an estimated travel time for a segment of the travel route based on current traffic data.

18. A method, comprising:
receiving a request, via a network, for a travel route, the request including an origin, a destination, and an estimated time of departure;
determining the travel route;
calculating a normal travel time;
using the normal travel time and the estimated time of departure to determine an estimated time of arrival;
multiplying the normal travel time by at least one adjustment factor to calculate an adjusted travel time, wherein the at least one adjustment factor is a numeric value associated with at least one of a weather condition, a construction condition, and an estimated travel time for a segment of the travel route based on current traffic data;
calculating an adjusted estimated time of arrival based on the estimated time of departure and the adjusted travel time; and
providing the estimated time of arrival to a client device via the network.

19. The method of claim 18, further comprising:
receiving an input modifying the estimated time of departure; and
calculating a new estimated time of arrival based at least in part on the input.

20. The method of claim 18, further comprising:
determining that the adjusted travel time exceeds a predetermined threshold;
identifying a set of endpoints for a sub-route of the travel route; wherein a portion of the adjusted travel time attributable to the sub-route exceeds a predetermined threshold for the sub-route; and
calculating a new sub-route between the endpoints.

21. The method of claim 18, tangibly embodied as a set of computer-executable instructions on a computer-readable medium.

* * * * *